United States Patent [19]

Nelson

[11] Patent Number: 5,038,920
[45] Date of Patent: Aug. 13, 1991

[54] LIGHTWEIGHT HIGH SPEED TRANSFER
[75] Inventor: Donald Nelson, Cockeysville, Md.
[73] Assignee: M.S. Willett, Inc., Cockeysville, Md.
[21] Appl. No.: 565,366
[22] Filed: Aug. 10, 1990
[51] Int. Cl.⁵ ............................................. B65G 25/02
[52] U.S. Cl. .................................. 198/774.4; 74/110; 414/749
[58] Field of Search ...................... 414/749, 750, 751; 198/774.4; 74/110

[56] References Cited

U.S. PATENT DOCUMENTS 4,040,514  8/1977  Pielsticker et al. ............... 198/774.4
4,793,472 12/1988  Salund ............................... 198/774.4

Primary Examiner—David A. Bucci
Assistant Examiner—Donald W. Underwood
Attorney, Agent, or Firm—James Creighton Wray

[57] ABSTRACT

A lightweight, high speed, quick change transfer for a press has plural slide assemblies. Each slide assembly has an elongated rectangular base plate, two U-shaped end support plates, and parallel guide shafts extending between the support plates. Linear bearings on the guide shaft and pillow blocks on the linear bearings support a reciprocating transfer slide with parallel sides and a central opening. A finger lift bar extends within the central opening. Sloped slots in the lift bars engage cam rollers held on shafts between the parallel sides of the transfer slides. Any number of slide assemblies and repeater slide assemblies may be used. Transfer bars with workpiece-engaging fingers connect ends of the finger lift bars in the slide assemblies, driving the finger lift bars in the repeater assemblies while moving the product-engaging fingers. Parallel lift drive bars move the transfer slides in repeater slide assemblies. Interconnections between the elements is limited to two rollers and two slots in each slot assembly. The transfer bars are easily removed and changed by removing two pins. Reduced moving mass and lightweight materials allow high speed operations. Each in moving the transfer bars allows quick changeover and easy tool access.

7 Claims, 3 Drawing Sheets

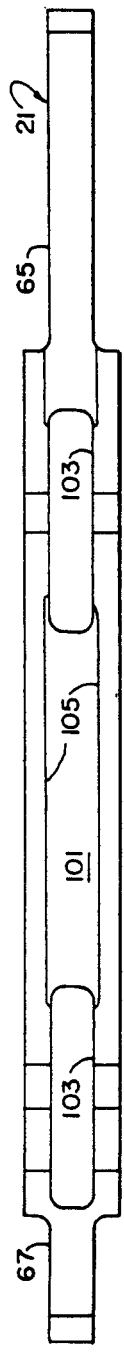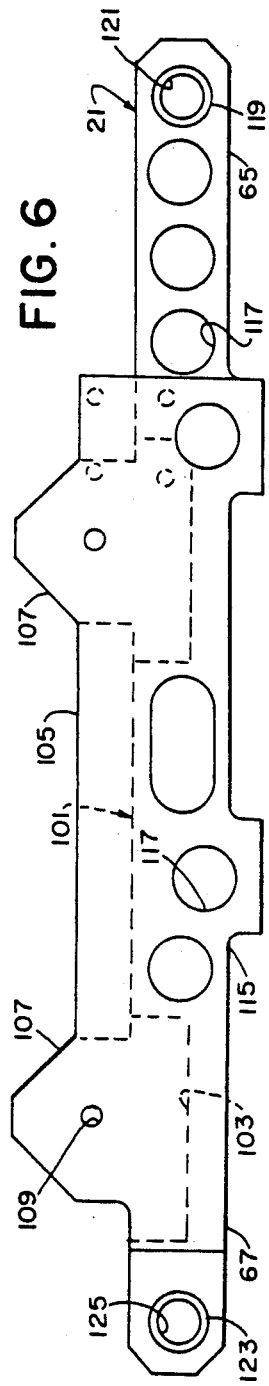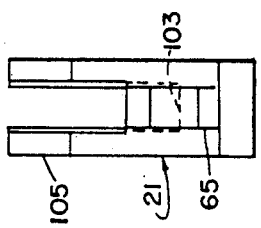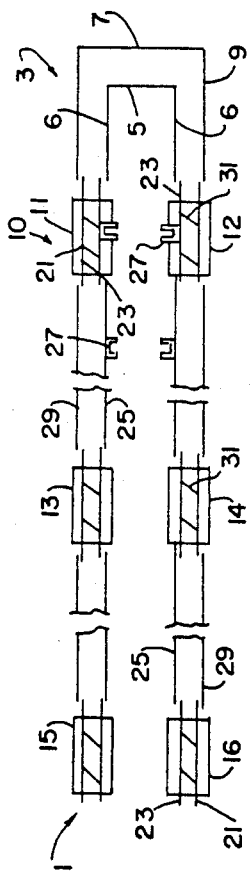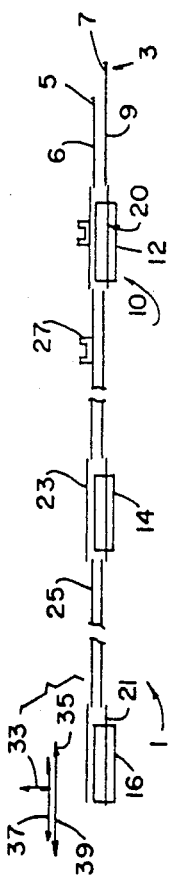

LIGHTWEIGHT HIGH SPEED TRANSFER

BACKGROUND OF THE INVENTION

This invention concerns transfers which move workpieces step by step between successive tooling stations within presses.

Speed and accuracy are essential requirements of transfers.

High moving mass of transfers limits the speeds which are attainable.

Hardened steel interengaging parts have been necessary to couple motions together. Attachment of transfer parts to press bolsters or tooling has been necessary to ensure the accuracy of movements. Changing transfers has required multiple steps requiring substantial uneconomical press downtime during installation and changing of transfers.

These and other problems continue to exist in the transfer art.

SUMMARY OF THE INVENTION

The present invention is directed to solving many of the problems existing in the prior art. The present invention provides transfer slide assemblies which can be rapidly mounted in press windows or outside of press bolster. Each slide assembly has long, thin and high aspect ratio cross-section transfer slide, and a long, thin, high aspect ratio finger lift bar. Four or more slide assemblies are positioned outside of press die area. Repeater slide assemblies may be interposed or added as required. Transfer bars are connected to ends of the finger lift bars with single pins, which are easily removed for changing transfer bars. Transfer bars and slide bars are made in sets of equal length so that the repeater and end slide assemblies can be positioned conveniently in press windows of any size press.

The present invention reduces weight of the moving mass of the transfer, permitting higher speeds than were previously obtainable.

Components may be made of aluminum rather than the hardened steel previously required to provide wear surfaces to couple the two motions together. The requirements for large parts of heavy hardened steel are eliminated in the present invention.

The present invention eliminates the T-nut and T-slot sections to ensure carrier bars move with transfer bars while allowing vertical or horizontal movement.

The present invention eliminates tongue-in-groove connections between lifter bars and carrier bars, which required use of heavy hardened steel parts.

The transfer and lift or clamp slide assemblies can be mounted in window openings of presses so that no attachment of transfers to die sets, press bolsters or tooling is necessary. That provides many advantages.

The slide assembly with repeater mechanism mounted in each window of a press also allows transfer of parts the full length of the press and through each window, if required.

The transfer bar connects the repeater mechanisms together to translate motion to the adjacent repeater assembly. This single bar acts as a transfer bar for mounting of fingers, as well as the main drive bar. The transfer bar can be easily removed by pulling two pins at connections of the repeaters for access to the tooling.

The lift bar or clamp bar also bridges the tooling and can be removed through removal of two pins.

Removal transfer bar with fingers provides for quick changeover, and allows other transfer bars and finger assemblies to be installed for various part shapes.

Throughout the specification for clarity, clamping or lifting motions have been referred to simply as "lift". Parts may be lifted and lowered into successive tooling stations or clamped and moved between stations. For the purposes of the present invention, the clamping is referred to simply as lifting, although the engaging and moving of the parts may require no vertical movement.

The present invention is useful with vertical lift and carry transfers, horizontal clamp and transfer, inverted walking beam transfers and conventional walking beam transfers, as well as with all types of transfers.

In a preferred lightweight, high speed, quick change transfer apparatus a repeater station has a rectangular horizontal base plate having longitudinal and transverse directions. First and second U-shaped support plates are mounted at opposite longitudinal ends of the base plate. The U-shaped support plates have first and second arms. First and second guide shafts respectively are mounted in the first arms and the second arms of first and second support plates. The guide shafts extend between the support plates in parallel relation to each other and in parallel relation to the base plate. First and second pillow blocks and first and second linear bearings are connected to each support shaft. A transfer slide has a central portion connected to the pillow blocks. First and second opposite longitudinal end portions connect to transfer and lift drive bars. The central portion has first and second spaced wall portions. The first wall portion is connected to the first set of pillow blocks, and the second wall portion is connected to the second set of pillow blocks. Each wall portion has first and second upward extending roller mounting portions. First and second roller shafts are connected between first upper portions and second upper portions respectively. First and second rollers are mounted on the first and second shafts. A long finger lift has a central portion and first and second opposite end portions for connecting to transfer drive bars. The central section has first and second sloped downward extensions and first and second sloped roller-receiving slots formed in the downward extensions. Weight-reducing openings extend across the width of the bar in the center and end portions for reducing weight and increasing lightness, speed and responsiveness of the finger lift bar. The transfer slide has weight-receiving openings in the central portion and at least one of the end portions for reducing weight and increasing speed and responsiveness of the transfer slide. The finger lift bar and transfer bars connected to the finger lift bar having work-gripping fingers for transferring work between stations.

First and second slide assemblies are mounted on opposite sides of press beds and on opposite sides of tooling within the press. Transfer drive bars are connected to first ends of the finger lift bars, and transfer slide and lift drive bars are connected to first ends of the transfer slides.

The transfer bars are connected to ends of the finger lift bars with single pins.

Ends of the transfer slides are connected to the ends of the transfer slide bars by single pins, and wherein the transfer slide bars and transfer bars are commensurate in length and are interchangeable for varying distances between the slide assemblies.

A lightweight, high speed, quick change transfer for a press has plural slide assemblies. Each slide assembly has an elongated rectangular base plate, two U-shaped end support plates, and parallel guide shafts extending between the support plates. Linear bearings on the guide shaft and pillow blocks on the linear bearings support a reciprocating transfer slide with parallel sides and a central opening. A finger lift bar extends within the central opening. Sloped slots in the lift bars engage cam roller held on shafts between the parallel sides of the transfer slides. Any number of slide assemblies and repeater slide assemblies may be used. Transfer bars with workpiece-engaging fingers connect ends of the finger lift bars in the slide assemblies, driving the finger lift bars in the repeater assemblies while moving the product-engaging fingers. Parallel lift drive bar move the transfer slides in repeater slide assemblies. Interconnections between the elements is limited to two rollers two slots in each slot assembly. The transfer bars are easily removed and changed by removal of two pins. Reduced moving mass and lightweight materials allow high speed operations. Ease in removing the transfer bars allows quick changeover and easy tool access.

These and further and other objects and features of the invention are apparent in the disclosure, which includes the above and ongoing written specification, with the claims and the drawings.

BRIEF DESCRIPTION OF THE DRAWINGS

FIG. 1 is a schematic horizontal view of a press with a transfer having several repeater slide assemblies.

FIG. 2 is a side elevation schematic representation of the apparatus show in FIG. 1.

FIG. 5 is a plan view of a transfer slide.

FIG. 6 is an elevation of a transfer slide.

FIG. 7 is an end elevation of the transfer slide shown in FIGS. 5 and 6.

DETAILED DESCRIPTION OF THE DRAWINGS

Figure 3:
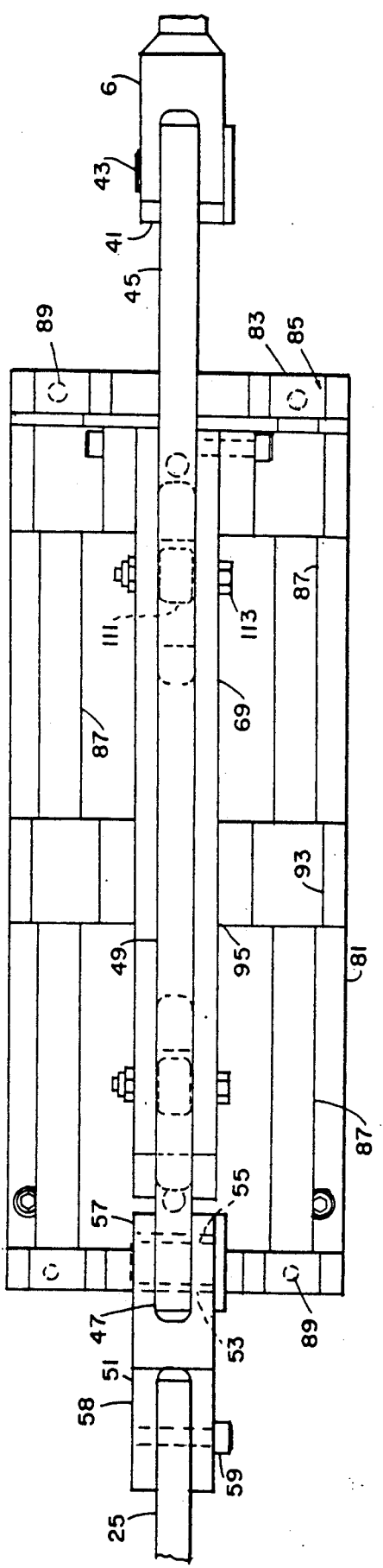
FIG. 3 is a plan view of a slide assembly.

Referring FIG. 1, a transfer of the present invention is generally by the numeral 1. The transfer has a drive 3, which includes a transfer drive 5 connected to transfer drive bars 6. A transfer and lift drive 7 is connected to transfer and drive bars 9.

The transfer includes a number of slide assemblies, generally indicated by the numeral 10. A first slide assembly 11 is positioned opposite a second slide assembly 12. A third slide assembly 13 is positioned opposite a fourth slide assembly 14, and fifth and sixth slide assemblies 15 and 16 are positioned opposite each other and beyond the third and fourth slide assemblies. Slide assemblies 13 and 14 may be referred to as repeater assemblies. The same may be true for slide assemblies 15 and 16.

Within the slide assemblies are reciprocating elements generally indicating by the numeral 20. The reciprocating elements include a transfer slide 21 connected to the transfer and lift drive 9, and a finger lift bar 23.

In slide assemblies 11 and 12, the transfer slides 21 are connected to the transfer and lift drive bars 9. The finger lift bars 23 are connected to the transfer drive bars 6.

Second ends of the finger lift bars 23 are connected to transfer bars 25, which have attached thereto the lift fingers 27. Connected between ends of spaced transfer slides 21 are transfer and lift bars 29.

The transfer and lift drive 7 reciprocates forward and rearward, causing lift drive bars 9 and the connected transfer slides 21 and transfer and lift bars 29 to reciprocate. Cam connections 31 within each slide assembly 11 between the transfer slides 21 and the finger lift bars 23 cause transverse movement of the lift bars 23 and the connected transfer bars 25 whenever the transfer drive 5 and transfer drive bars 6 do not reciprocate with the transfer and lift drive 7 and the drive bars 9. The cam connections 31 cause that movement, such as, for example, in the direction of arrows 33, upon relative motion of the sliding members 21 and 23 in either sense of direction 35. The finger lift bars reciprocate as shown by directional line 37, while the transfer slides reciprocate to a greater extent as shown by the arrow 39. The motions 37 and 39 are in phase twice during each cycle and relative twice during each cycle.

Elements similar to those shown in FIG. 1 are schematically shown in FIG. 2.

Figure 4:
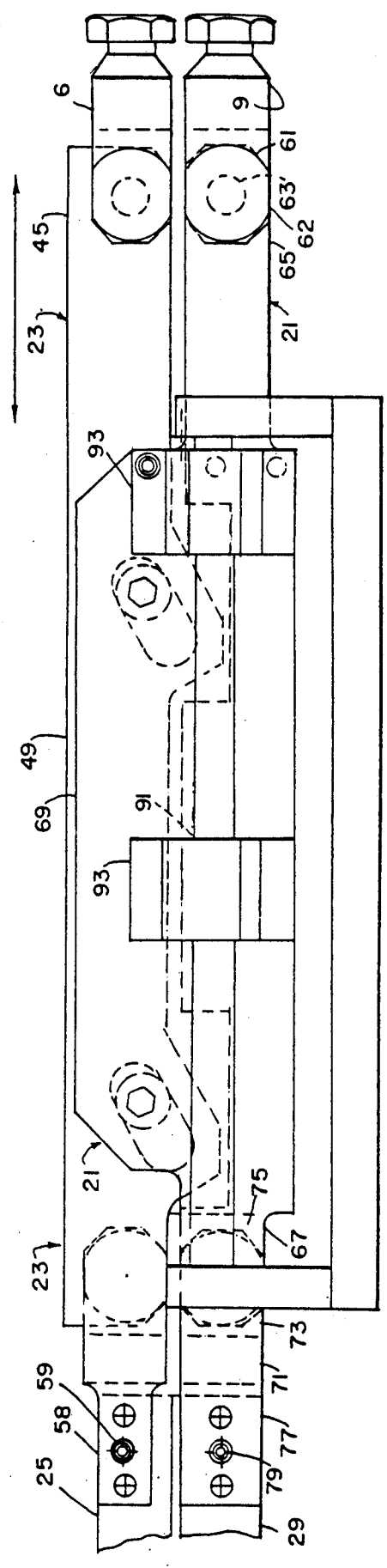
FIG. 4 is an elevation of the slide assembly.

Referring to FIGS. 3 and 4, transfer drive bar 6 and lift drive bar 9 are vertically arranged. The transfer drive bar is shown in the plan view of FIG. 3. Bar 6 has a clevis 41 with a pin 43, which connects the drive bar to one of the reciprocating elements in the slide assembly 11.

The finger lift bar 23 shown in FIGS. 3 and 4 has end connection portions 45 and 47 and a central portion 49, which includes the cams 31. A connector 51 connects the second end 47 of the finger lift bar 23 to the transfer bar 25. The connector includes a bushing 53 and a pin 55, which extend through aligned openings in a clevis 57 and the second end 47 of the finger lift bar 23. The connector 51 includes a clevis 58 with a further pin 59, which extends through aligned openings in the clevis and in the first end of the transfer bar 25. The transfer slide 21 has a first end 65, a second end 67 and a middle portion 69. A clevis 61 and a pin 63 having a head 62 connect the lift and transfer drive bar 9 to the first end 65 of the transfer slide 21.

A connector 71 having a clevis portion 73 and a pin 75 with a bushing connect the second end 67 of the transfer slide. The lift bar 29 and the second end of connector 71 are connected by a clevis 77 and a pin 79. Similar pins and connectors are connected to opposite ends of the bars.

Removing the pins 55 permits lifting and removal of the transfer bars from the finger lift bar 23. Removing the second pins 75 permits lifting the lift bars 29 from the transfer slide bar 21.

As shown in FIGS. 3 and 4, each slide assembly 11 has an elongated rectangular base plate 81 and two U-shaped support plates 83 at opposite ends of the base plate. The support plates have openings 85 which receive ends of guide shafts 87. Locks screws 89 lock the guide shafts in place. Linear bearings 91 are mounted in pillow blocks 93 which have bases 95 secured to the middle section 69 of the transfer slide 21. The linear bearings 91 as supported on the guide shaft 87 support the reciprocal motion of the entire transfer assembly 1. The reciprocating members 21 and 23 in the slide assemblies 11, as well as the transfer bars 25, the engagement fingers 27 and the lift connector bars 29, are supported by the linear bearings 91 and guide shafts 87.

As shown in FIGS. 5 and 6, the center section 69 of the transfer slide 21 has a central recess 101 which terminates in two end recesses 103. Two side wall sections 105 bound the central recess. Parallel lateral side extensions 107 extend upward on opposite sides of the recesses 103. The parallel extensions have openings 109 to receive cam rollers 111 as shown in FIG. 3, which are mounted on shaft-type bolts 113 extended through the openings 109. The transfer slides have solid lower portions 115. Weight reducing openings 117 are formed throughout the transfer slide 21. The first end 65 has a connector opening 119, which a bushing 121 for connecting to pin 53, as shown in FIG. 4. The second end 67 has a hole 123 with a bushing 125 for receiving the pin 75, as shown in FIG. 4.

The end view, FIG. 7, shows that the cross-section of the transfer slide 21 has a high aspect ratio for lightness and strength.

Figure 8:
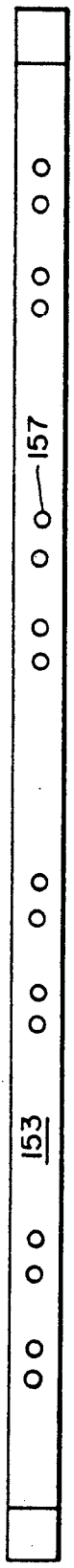
FIG. 8 is a plan view of a finger lift bar.
Figure 9:
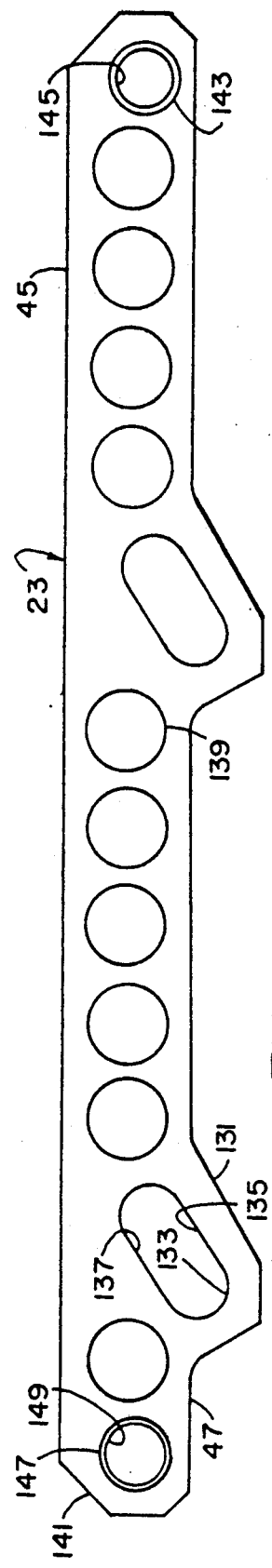
FIG. 9 is an elevation of the finger lift bar.
Figure 10:
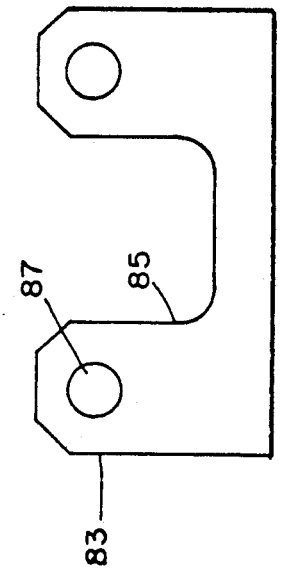
FIG. 10 is an end elevation of the finger lift bar shown in FIGS. 8 and 9.

The finger lift bar 23 is shown in FIGS. 8, 9 and 10. The generally rectangular bar has first and second end section 45 and 47 and a central camming section 49. The central section 49 has downward extensions 131 with sloped slots 133, which receive the rollers 111 shown in FIG. 3, thereby forming the cams 31. When the sliding elements which are the transfer slide 21 and the finger lift bar 23 move relative to each other, the roller 111 rolls against one of the surfaces 135 or 137, causing the finger lift bar 23 to move transversely to the main direction of reciprocation.

Weight-reducing openings 139 are formed throughout the bar 23. The ends 141 of the bar are chamfered. An opening 143 in the first end has a bushing 145 for receiving the pin 43. Opening 147 in the second end 47 has a bushing 149 for receiving the pin 55 shown in FIG. 3.

FIG. 10 shows the high aspect ratio of a cross-section of the bar 23, which provides lightness and rigidity. Threaded openings 151 in the surface 153 shown in FIG. 8 are used to secure transfer fingers 27 to the finger lift bars.

The transfer bars 25, which move with the transfer lift bars 23, preferably have a similar high aspect ratio cross-section and may be made of aluminum or other strong, light material.

Figure 11:
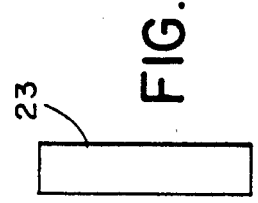
FIG. 11 is an end elevation of a support plate.

As shown in FIGS. 3, 4 and 11, the support plate 83 has two upward-extending arms 155 in which the openings 85 are formed to support the shafts 87. The transfer slide 21 reciprocates between the upper arms 85.

The support plates may be mounted in any particular orientation to support the guide shafts, which in turn support the reciprocating elements of the transfer. Orientation of the plane of the guide shafts or configuration of the sliding members may be controlled so that the workpiece-engaging fingers move transversely up and down or in and out or at an angle as the transfer reciprocates.

The present invention provides a lightweight, strong transfer which requires the removal of only two pins to remove a transfer bar and gain access to the tooling. The present invention is suitable for rapid mounting in presses. The present invention provides reduced weight of moving mass of transfer, resulting in enabling higher speeds than previously obtainable. The components may be made from aluminum rather than hardened steel. The present invention eliminates T-nuts and T-slots and tongue-in-groove connections between lifter bars and carrier bars. The slide assemblies can be mounted in window openings of presses so that no attachment of transfers to die sets, press bolsters or tooling is necessary. The repeater mechanism may be mounted in each window press, allowing the transfer of parts for the full length of the press and through each window, if desired.

The transfer bar connects the repeater mechanism together to provide the translating motion to the adjacent repeater assembly. The single bar acts as the transfer bars with fingers attached, as well as the drive bar.

While the invention has been described with reference to specific embodiments, modifications and variations of the invention may be constructed without departing from the scope of the invention, which is defined in the following claims.

I claim:

1. A lightweight high speed transfer apparatus, comprising a repeater station having a slide assembly comprising a rectangular horizontal base plate having longitudinal and transverse directions, first and second U-shaped support plates mounted at opposite longitudinal ends of the base plate, the U-shaped support plates having first and second arms, first and second guide shafts respectively mounted in the first arms and the second arms of the first and second support plates, the guide shafts extending between the support plates in parallel relation to each other and in parallel relation to the base plate, first and second pillow blocks having respectively first and second linear bearings connected to each support shaft, a transfer slide extending between the U-shaped arms and connected between the first and second pillow blocks connected to the first drive shaft, and to the first and second pillow blocks connected to the second guide shaft, the transfer slide comprising a long, thin slide having a high aspect ratio of height to width, the transfer slide comprising a central portion connected to the pillow blocks and first and second opposite longitudinal end portions for connecting to transfer and lift drive bars, the central portion having first and second spaced wall portions, the first wall portion connected to the first set of pillow blocks and the second wall portion connected to the second set of pillow blocks, each wall portion having first and second upward extending roller mounting portions, first and second roller shafts connected between first upper portions and second upper portions respectively, and first and second rollers mounted on the first and second shafts, a long finger lift bar having a high aspect ratio of height to width and having a central portion and first and second opposite end portions for connecting to transfer drive bars, the central section having first and second sloped downward extension and first and second sloped roller-receiving slots formed in the downward extensions and receiving the first and second rollers, the finger lift bar having weight-reducing openings extending across the width of the bar in the center and end portions for reducing weight and increasing lightness, speed and responsivness of the finger lift bar, and the transfer slide having weight-receiving openings in the central portion and at least one of the end portions for reducing weight and increasing speed and responsiveness of the transfer slide, the finger lift bar and transfer drive bars connected to the finger lift bar having work-gripping fingers for transferring work between stations.

2. The transfer apparatus of claim 1, further comprising first and second slide assemblies for mounting on opposite sides of press beds, on opposite sides of tooling within the press, transfer drive bars connected to first end of the finger lift bars, and transfer slide and lift drive bars connected to first ends of the transfer slides.

3. The apparatus of claim 2, further comprising third and fourth slide assemblies having third and fourth base plates positioned on opposite sides of the press bed in alignment with the first and second assemblies respectively and spaced therefrom, and respectively having third and fourth transfer slides and third and fourth finger lift bars, first and second transfer bars respectively having first and second ends, first ends of the transfer bars connected to second ends of the first and second finger lift bars, the second ends of the transfer bars being connected to the first ends of the third and fourth finger lift bars, and first and second transfer slide bars being connected between the first and third and second and fourth transfer slides respectively.

4. The apparatus of claim 3, wherein transfer fingers are connected to the transfer bars, and wherein the transfer bars are connected to ends of the finger lift bars with single pins.

5. The apparatus of claim 3, further comprising first and second repeater slide assemblies respectively mounted beyond the third and fourth slide assemblies, the first and second repeater assemblies having fifth and sixth transfer slides and finger lift bars respectively, and further comprising third and fourth transfer bars respectively connected between ends of the third and fifth finger lift bars and ends of the fourth and sixth finger lift bars and fourth and second and third transfer slide bars respectively connected between ends of the third and fifth transfer slides and fourth and sixth transfer slides.

6. The apparatus of claim 5, wherein ends of the transfer slides are connected to the ends of the transfer slide bars by single pins, and wherein the transfer slide bars and transfer bars are commensurate in length and are interchangeable for varying distances between the slide assemblies.

7. A lightweight high speed quick change transfer apparatus, comprising plural slide assemblies having reciprocating elements and bars interconnecting the reciprocating elements in the spaced slide assemblies, the reciprocating elements in each slide assembly comprising a finger lift bar having two sloped slots, two rollers mounted in the sloped slots, a transfer slide having an elongated recess partially receiving the finger lift bar and having two sides with openings therein, shafts supported in the openings in opposite sides of the transfer slide for mounting the rollers on the shafts, and opposite longitudinal ends of the lift bar having connectors for connecting to reciprocating bars and longitudinal ends of the transfer slide having connectors for connecting to ends of reciprocating bars.

* * * * *